United States Patent
Hammon et al.

(10) Patent No.: US 10,637,649 B2
(45) Date of Patent: *Apr. 28, 2020

(54) RANDOM CIPHER PAD CRYPTOGRAPHY

(71) Applicant: 7Tunnels, Inc., Park City, UT (US)

(72) Inventors: Michael L. Hammon, Ames, IA (US); Kevin R. McCarthy, Park City, UT (US)

(73) Assignee: 7Tunnels, Inc., Park City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/011,301

(22) Filed: Jun. 18, 2018

(65) Prior Publication Data
US 2019/0058579 A1    Feb. 21, 2019

Related U.S. Application Data

(63) Continuation of application No. 15/134,260, filed on Apr. 20, 2016, now Pat. No. 10,003,457.
(Continued)

(51) Int. Cl.
*H04L 9/20* (2006.01)
*H04L 9/28* (2006.01)
(Continued)

(52) U.S. Cl.
CPC ............ *H04L 9/065* (2013.01); *G06F 7/588* (2013.01); *H04L 9/0656* (2013.01); *H04L 9/083* (2013.01)

(58) Field of Classification Search
None
See application file for complete search history.

(56) References Cited

U.S. PATENT DOCUMENTS 5,799,090 A * 8/1998 Angert ............... H04L 9/0662
                                                    380/262
6,069,954 A * 5/2000 Moreau ............... H04L 9/0668
                                                    380/268
(Continued)

FOREIGN PATENT DOCUMENTS

EP      1808977 A1    7/2007
WO    2004/105296 A2   12/2004
(Continued)

OTHER PUBLICATIONS

International Search Report from International Application No. PCT/US2016/028504, dated Jan. 24, 2017, 3 pages.
(Continued)

*Primary Examiner* — Fatoumata Traore
(74) *Attorney, Agent, or Firm* — Phillips Ryther & Winchester; Gregory C. Baker

(57) ABSTRACT

Methods for a server include defining a starting element and an element step size. A pad mapping is applied to a data Random Cipher Pad (RCP) to obtain a Key RCP using each element of the Data RCP once in a predetermined non-sequential order. The starting element and the element step size are combined with the Data RCP. The Data RCP is encrypted using the Key RCP to produce a subsequent Data RCP. The subsequent Data RCP is transmitted to another computer. Methods for clients include applying a pad mapping to a Data RCP to obtain a Key RCP using each element of the Data RCP once in a predetermined non-sequential order to develop the Key RCP. The Key RCP is encrypted using the Data RCP to produce a subsequent Key RCP. A data structure is encrypted using the Data RCP to produce an encrypted data structure.

29 Claims, 8 Drawing Sheets

Related U.S. Application Data

(60) Provisional application No. 62/152,816, filed on Apr. 24, 2015.

(51) Int. Cl.
  *H04K 1/00* (2006.01)
  *H04L 9/06* (2006.01)
  *G06F 7/58* (2006.01)
  *H04L 9/08* (2006.01)

(56) References Cited

U.S. PATENT DOCUMENTS

| | | | |
|---|---|---|---|
| 6,359,986 B1 | 3/2002 | Tatebayashi | |
| 8,467,533 B2* | 6/2013 | Hammersmith | H04L 9/083 380/277 |
| 2008/0019525 A1 | 1/2008 | Kruegel et al. | |
| 2010/0074441 A1* | 3/2010 | Pauker | H04L 9/0625 380/45 |
| 2010/0198846 A1 | 8/2010 | Gupta | |
| 2012/0063597 A1 | 3/2012 | Tropp et al. | |
| 2013/0223628 A1 | 8/2013 | Cho et al. | |

FOREIGN PATENT DOCUMENTS

| | | |
|---|---|---|
| WO | 2012139174 A1 | 10/2012 |
| WO | 2013026086 A1 | 2/2013 |

OTHER PUBLICATIONS

International Written Opinion from International Application No. PCT/US2016/028504, dated Jan. 24, 2017, 12 pages.
Jormakka et al., "UAV-based Sensor Networks for Future Force Warriors", International Journal on Advances in Telecommunications, vol. 4, No. 1, (Jan. 2011) pp. 58-71, XP05518255, Section IV.
European Search Report and Written Opinion from European Application No. 16824823.5, dated Nov. 2, 2018, 7 pages.

* cited by examiner

RANDOM CIPHER PAD CRYPTOGRAPHY

CROSS-REFERENCE TO RELATED APPLICATIONS

This application is a continuation of U.S. patent application Ser. No. 15/134,260, filed Apr. 20, 2016, now U.S. Pat. No. 10,003,457, issued Jun. 19, 2018, which is a utility conversion of and claims priority to U.S. Provisional Patent Application Ser. No. 62/152,816 titled "Dual Use Pad Encryption Using One-time Pads," filed Apr. 24, 2015, the disclosure of each of which is hereby incorporated herein in its entirety by this reference.

TECHNICAL FIELD

Embodiments of the present disclosure relate generally to cryptography and more specifically to encryption and decryption using data and structures similar to one-time pads.

BACKGROUND

Cryptography is important for many types of communications including, but certainly not limited to, communications involving financial data, medical data, and government classified data. Many types of encryption are very difficult to decrypt, but can eventually be broken. Other types of encryption have significant vulnerabilities making decryption relatively easy. Conventional one-time pads are generally considered completely secure and unbreakable. However, conventional one-time pads have a drawback related to how to convey the one-time pads to keep them secret. Moreover, for conventional one-time pads, the length of the key is equal to the length of the data to be encrypted, which may be unsuitable for low-bandwidth applications even if secure conveyance of the one-time pad is possible.

DETAILED DESCRIPTION

Figure 1:
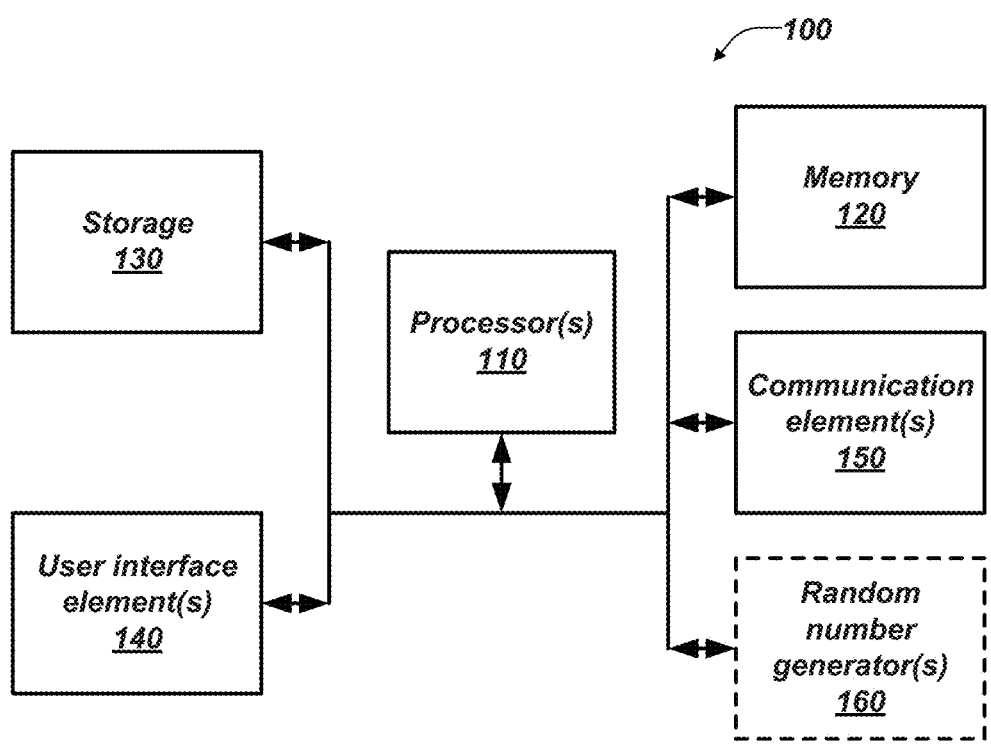
FIG. 1 is a block diagram illustrating a computing system for practicing embodiments of the present disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings are included herein to aid in locating certain sections of detailed description. These headings should not be considered to limit the scope of the concepts described under any specific heading. Furthermore, concepts described in any specific heading are generally applicable in other sections throughout the entire specification.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

FIG. 1 illustrates a computing system 100 for practicing embodiments of the present disclosure. As non-limiting examples, the computing system 100 may be a user-type computer, a file server, a compute server, a notebook computer, a tablet, a handheld device, a mobile device, or other similar computer system for executing software. Computer, computing system, and server may be used interchangeably herein to indicate a system for practicing embodiments of the present disclosure. The computing system 100 is configured for executing software programs containing computing instructions and includes one or more processors 110, memory 120, storage 130, user interface elements 140, and one or more communication elements 150. Some embodiments of the computing system 100 may include one or more random number generators 160 as explained more fully below in connection with FIGS. 2 through 5B.

The one or more processors 110 may be configured for executing a wide variety of operating systems and applications including computing instructions for carrying out embodiments of the present disclosure.

The memory 120 may be used to hold computing instructions, data structures, and other information for performing a wide variety of tasks including performing embodiments of the present disclosure. By way of example, and not limitation, the memory 120 may include Synchronous Random Access Memory (SRAM), Dynamic RAM (DRAM), Read-Only Memory (ROM), flash memory, and the like.

The memory 120 may include other types of memory devices, including volatile storage devices or non-volatile storage devices, configured to store information. Examples of other types of memory 120 include nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

The storage 130 may be used for storing relatively large amounts of non-volatile information for use in the computing system 100 and may be configured as one or more storage devices. By way of example, and not limitation, these storage devices may include computer-readable media (CRM). This CRM may include, but is not limited to, magnetic and optical storage devices such as disk drives, magnetic tapes, optical storage drives such as CDs (compact disks), DVDs (digital versatile discs or digital video discs), and other equivalent storage devices.

Information related to the computing system 100 may be presented to, and received from, a user with one or more user interface elements 140. As non-limiting examples, the user interface elements 140 may include elements such as displays, keyboards, mice, joysticks, haptic devices, microphones, speakers, cameras, and touchscreens. A display on the computing system may be configured to present a graphical user interface (GUI) with information about the embodiments of the present disclosure.

The communication elements 150 may be configured for communicating with other devices or communication networks. As non-limiting examples, the communication elements 150 may include elements for communicating on wired and wireless communication media, such as for example, serial ports, parallel ports, Ethernet connections, universal serial bus (USB) connections IEEE 1394 ("firewire") connections, BLUETOOTH® wireless connections, 802.1 a/b/g/n type wireless connections, cellular phone connections, TCP/IP, FTP, HTTP, and other suitable communication interfaces and protocols.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

By way of non-limiting example, computing instructions for performing the processes may be stored on the storage 130, transferred to the memory 120 for execution, and executed by the processors 110. The processors 110, when executing computing instructions configured for performing the processes, constitutes structure for performing the processes and can be considered a special-purpose computer when so configured. In addition, some or all portions of the processes may be performed by hardware specifically configured for carrying out the processes.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device 130 (e.g., a computer readable storage medium), in memory 120, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage 130 or memory 120 devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Embodiments described herein facilitate utilization of Random Cipher Pads (RCPs), which may be somewhat similar to conventional one-time pads, but used in new and different ways. The RCPs are used not only to encrypt information (for example, documents, media streams, and data files), but also to encrypt subsequent RCPs that in turn can be used by the original users recursively.

Conventional one-time pad encryption is generally recognized as being unbreakable. Similarly, RCPs include these unbreakable attributes as long as the method to use RCPs recursively is set up for the originator and recipient(s). Thus, an endless number of RCPs can be used by them, as long as the party generating the RCPs continues to send subsequent RCPs encrypted by the preceding RCPs and the used RCPs are destroyed.

Interception of the transmission generally will not help an intruder since RCP encryption cannot be broken. At worst, the intended recipient will not receive the transmission intended for him and will contact the sender, uncovering a theft or loss of information.

In some embodiments, the initial RCP exchange installation is done "outside" the electronic environment, or done in a highly secure manner with full authentication of Sender and Recipient. This results in a situation where each subsequent RCP cannot be decrypted and therefore cannot be intercepted for use.

This setup allows an enterprise, for example, an HMO that needs to send medical records to thousands of customers compliant with the Health Insurance Portability and Accountability Act (HIPPA), a way to insure that customer or participant information is not being stolen.

As another example, it also assures that transmission of information between two government agencies, for instance the Justice Department and the Treasury Department, is always secure during transmission.

Conventional one-time pads are currently not practical for ubiquitous use, or even enterprise use, because each pad is a singular event and the sender and recipient(s) must have an identical pad for each transmission. Identical pads are requisite for encryption and decryption. Heretofore, conventional one-time pads between sender and receiver were exchanged using Public Key Encryption (PKE), which is breakable. The use of PKE to "secure" exchange of pads is not secure, and increasingly vulnerable. Delivering a new pad manually (e.g., by mail or courier) for each new use is impractical, costly, and inefficient; plus, the method of getting each successive pad into one or more recipients' hands creates vulnerabilities.

The following aspects, presented in separate or cumulative embodiments, present functionality opportunities possible with RCP encryption methods or processes. In general, an RCP may be used for data encryption and separately used for encrypting features of the encryption process itself. In other words:
1. The original RCP can be used to encrypt for electronic transmission a new, uncorrelated RCP that is also unbreakable.
2. The new uncorrelated RCP is encrypted using an RCP that came before it, meaning that the new RCP cannot be decrypted or used even if intercepted.
3. Multiple new RCPs can be generated and transmitted (along with the documents or information they encrypt or separately) by the original user(s).

Stated another way, embodiments of the present disclosure include apparatuses and methods for providing cryptographic procedures including remapping a current RCP into an uncorrelated random variable used for securely passing a replacement RCP. These embodiments are configured to reduce and/or eliminate attack surfaces. This recursive process implies that an initial RCP and mapping data may be installed in conjunction with original software installation as part of an end-point registration process. The initial RCP and mapping data may be configured such that they include matching data on a server or other device. In order to insure the integrity of the system an initial install including the initial RCP should be completed using high security protocols.

Before describing specific embodiments, and in order to facilitate description in the present disclosure, various terms are described herein. Where ambiguity may exist between the plain meaning, dictionary meaning, and the term as described herein, a person of ordinary skill in the art will recognize the term as described herein will best conform to a more comprehensive understanding of embodiments of the present disclosure.

A "True Random Number Generator" (TRNG) is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise.

A "One Time Pad" (OTP) is a conventional random cipher key pair in which each key pair is used only once and then destroyed. One key of the pair is used to encrypt a message and the other key of the pair is used to decrypt the encrypted message. Commonly OTPs are a method of symmetric encryption and the keys are identical.

A "Random Cipher Pad" (RCP) is a different form of an OTP according to embodiments of the present disclosure. The term RCP may be used as a generic term for various species of RCPs. An RCP is a collection of truly random numbers, e.g., gathered from one or more TRNGs. The use of the word "random" evokes the protection an OTP offers by alluding to the truly random nature of the cipher. Although the size of the RCPs could vary between instantiations, or perhaps even within a particular instantiation, RCPs in many instances are measured in kilobytes or even larger units.

An "RCP pool" is a collection of RCPs. Each RCP within an RCP pool may be identified by a number that is unique within that pool (e.g., a sequential integer). Globally Unique IDentifiers (GUIDs), each comprising a unique 128-bit number, may be used as identifiers such that careful construction of this number can guarantee global uniqueness within any particular system. Thus, in some embodiments, each RCP pool may be identified with a GUID. Moreover, while a simple sequential identifier may be used to identify each RCP within an RCP pool, a GUID, a hash of the RCP, or other type of unique identifier may be used instead to identify each RCP within an RCP pool.

A "Data RCP" is a species of RCP used to encrypt and decrypt communications between two or more endpoints. Each Data RCP is only used once.

A "Key RCP" is a species of an RCP used to encrypt and decrypt a Data RCP to securely transfer it electronically. Each Key RCP is only used once.

"Mapping" is a process of converting a Data RCP, once used, into a Key RCP for secure transfer of a subsequent Data RCP.

A "mapping index" is a list of numbers that includes the integers from one through the number of units (e.g., bytes, words, etc.) in a Data RCP in random order. The mapping index may be encrypted and sent to the appropriate endpoints of a particular communication channel and may be used as part of the process to convert Data RCPs into Key RCPs.

The terms "encrypted," "encrypted data," "encrypted data structure," and "encrypted message" refer to data that has passed through an encryption process according to embodiments of the present disclosure. As a non-limiting example, encrypted data may be generated by performing a bitwise exclusive-OR between a plain text message and an RCP.

The terms "decrypted," "decrypted data," "decrypted data structure," and "decrypted message" refer to data that was previously encrypted and has been returned to its original value. As a non-limiting example, decrypted data may be generated by performing a bitwise exclusive-OR between an encrypted message and the same RCP that was used to encrypt the plain text message.

The terms "unencrypted," "unencrypted data," "unencrypted data structure," and "unencrypted message" refer to data that has never been encrypted.

The term "commutative" refers to a characteristic of the application of multiple RCPs in a manner that the order in which data is encrypted using multiple RCPs does not matter. In other words, as long as the same set of RCPs is used to encrypt and decrypt, using the RCPs in different orders for encryption and decryption will produce the same final result.

The term "pad" may be generically used herein to refer to an RCP according to embodiments of the present disclosure.

In contrast, a conventional one-time pad is explicitly referred to as a conventional one-time pad or a one-time pad and not simply as a pad.

Implementation Overview

This section describes an overview of certain embodiments before a detailed description of each of the figures. Embodiments of the device and method described herein allow the RCP currently in use to be re-used to encrypt and send the next RCP. Since the data in this case is purely random and the current RCP is destroyed after use, there is no opportunity to perform cryptographic analysis.

Furthermore, in some embodiments as an additional safeguard the sampling sequence while using the RCP may not be sequential. For example, one of many randomization methods might be to start using the RCP at a random pad address and then advance through the RCP using a random step size. The information about starting address and step size would be sent to the decryption device along with the data to be decrypted.

It is a characteristic of RCP encryption that if an exclusive OR operation is used to encrypt the data then applying the exclusive OR (XOR) a second time (with the same RCP data) will decrypt the data. Therefore, the encryption and decryption processes are similar. However, encryption and decryption are not restricted to the use of XOR as the encryption operator for the RCP encoder and decoder. Any suitable symmetric operation could be used.

Since new RCPs are encrypted and downloaded using old RCPs, some embodiments address the origin of the first RCP that is used. In some embodiments, each pair of installations is unique and contains a relatively large seed RCP. In some embodiments, the seed RCP is never deleted and only used during product initialization and product disaster recovery. After several uses, the seed RCP may be replaced. This process would be done by using tamper evident transmission or courier delivery.

An embodiment of a process for sending a secure document is described below. In this description, it is assumed that both parties (designated as 'A' and 'B') have completed installation and initialization of the product.

1. A has a document and wants to send it to B.
2. The process performs any required pre-processing and starts scanning the document and RCP byte by byte.
3. A randomly picks the randomization method and constants to be used to determine the path through the RCP.
4. Authentication, hash values, check sums, and byte counts may be pre-computed and embedded with the un-encrypted data.
5. Each byte of the document (and metadata) is ex-ORed with the corresponding RCP byte and held in a temporary location.
6. When encryption is complete, A embeds the RCP randomization method and constants with the encrypted data. This metadata may not be encrypted, but it may be obfuscated so it appears to be part of the encrypted stream.
7. A sends this encrypted data to B via standard methods (e.g., TCP/IP, FTP, and HTTP).
8. When this data is received by B, B follows the reverse procedure to recover the unencrypted data.

In some embodiments, RCP generation takes place on the computer that has the greatest resources, either on the sender's computer or on the recipient's computer. Alternatively, the RCP generation may be performed by a third-party intermediary computer or reference computer (e.g., an RCP server 210, see FIG. 2).

RCP generation may run in its own thread and take place with very little communication with the encryption/decryption (client) thread. In some embodiments, the two client threads maintain a local pool of several RCPs, which they can quickly switch to as the decision is made to retire the current RCP. When that pool drops below a specified number the RCP maintenance thread requests the RCP generator thread send another RCP pair to the two clients' RCP pools. The client maintenance thread also may maintain the RCP use count, which determines when RCPs should be retired.

The RCP generator thread may monitor its pool level causing the True Random Number Generator (TRNG) to produce new RCPs. In some embodiments, the quality of the TRNG is important. The size of RCPs may be intentionally kept as small as is realistic. Keeping the RCPs small may help to avoid unnecessary RCP latency. The faster RCPs are used and destroyed, the more secure the system is.

Although RCP sizes may vary in different implementations, or even over different stages of the same communications stream between sender and receiver devices, current prototypes have RCP sizes of 100,003 bytes (the smallest prime greater than 100,000). There may be path randomization benefits to prime sizes.

"Large" files may be defined as anything larger than the RCP size. On average, the RCP will be retired for every {RCP size} bytes of data. As a result, a 1 gigabyte file will use and retire around 10,000 RCPs, and the same file will be sent in 10,000 segments that are re-assembled at the receiving thread.

Conversely, a small file of about 1,000 bytes, with no other file activity would not replace the RCP until it was naturally retired. Therefore, the time to retain partially used RCPs during inactive periods can be specified by the user.

During decryption several factors may be monitored to guarantee message integrity (Authentication, hash values, check sums, and byte counts) when these fail the data block is refused by sending a NAK (Negative AcKnowledgement) signal to the sender. This causes the sender to reformat and resend the message. If everything is OK, the recipient sends an ACK (ACKnowledgement) signal to the sender who then formats and sends the next block.

In some embodiments, some or all of the encryption features described herein are implemented within a computer processor or processing device that executes the encryption procedures. The transformation of data that occur according to the specific encryption techniques described herein render the processing device as a special-purpose processing device capable of new functionality that is otherwise not available using conventional programming or logical procedures. Furthermore, efficient processing of such encryption procedures requires implementation within computer processing systems. Furthermore, the interactions between an electronic storage device to store data associated with the encryption techniques described herein and the computer processing devices to execute the encryption techniques described herein achieve much greater efficacy than would be possible through other non-computerized means.

Implementation Details

This section describes implementation details of certain embodiments with reference to FIGS. 2-8.

Figure 2:
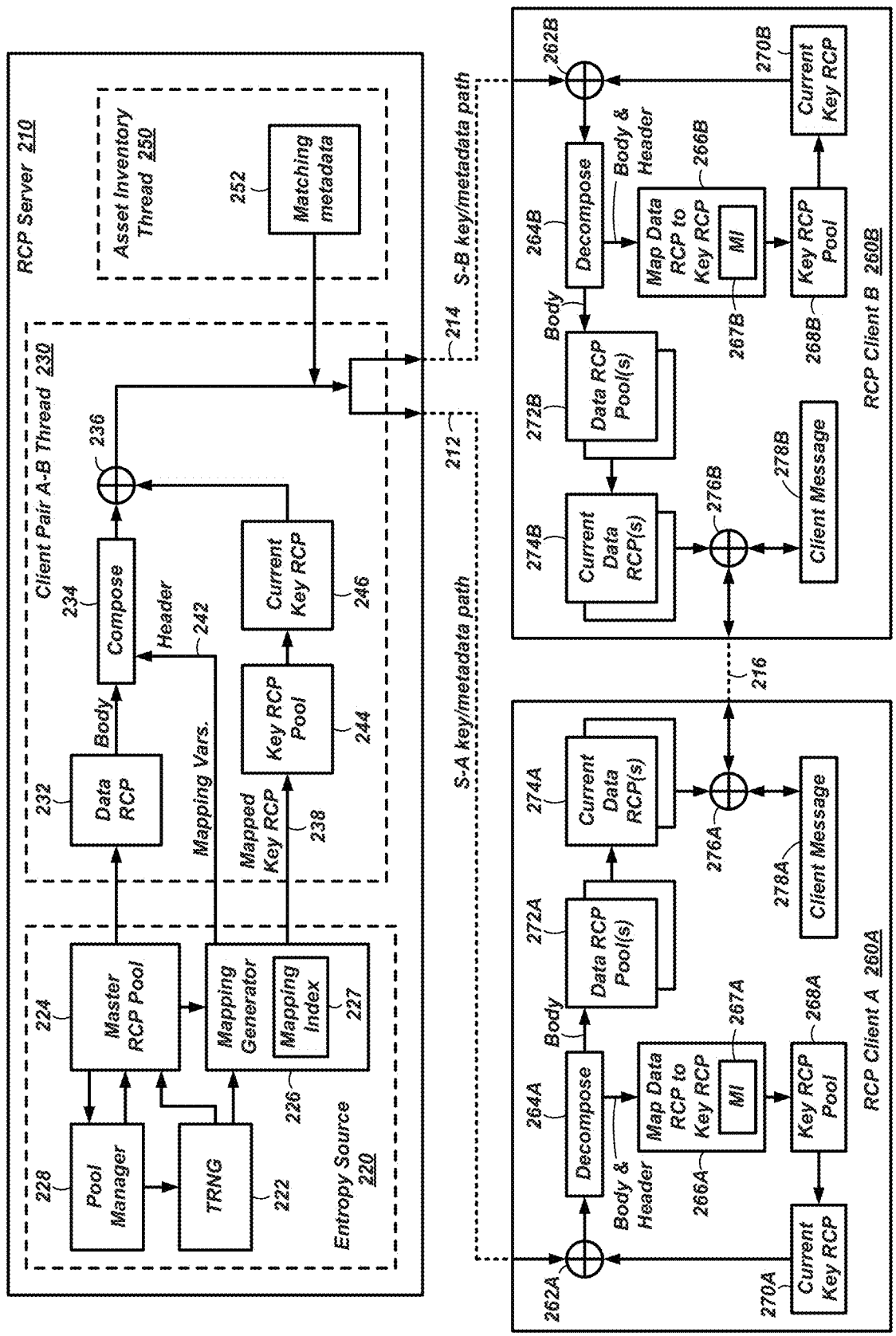
FIG. 2 is a block diagram illustrating a system including a Random Cipher Pad (RCP) server and RCP clients for message encryption.

FIG. 2 is a block diagram illustrating a system including an RCP server 210, and two RCP clients (260A and 256B) for message encryption.

The RCP server 210 may include various processes, which may run in separate threads on the RCP server 210. An entropy source 220 may be used to generate random numbers and manage a master RCP pool 224. One or more RCP client pair threads 230 (e.g., RCP client pair A-B thread 230 is shown in FIG. 2) may be used to generate Key RCPs and Data RCPs. One or more asset inventory threads 250 may be included to manage the RCPs for the various RCP client pairs and manage matching metadata 252 for the various RCP client pairs.

For ease of description, FIG. 2 is a simplified depiction of an overall system. A person of ordinary skill in the art will recognize that there may be many RCP clients in a system according to the present disclosure. Moreover, many different RCP clients may wish to communicate. In systems of the present disclosure, communication occurs between a pairing of RCP clients as well as pairing between the RCP server 210 and each RCP client 260. For example, perhaps there are four RCP clients; client A, client B, client C, and client D. In such a system, the RCP server 210 may need to manage Data RCPs and Key RCPs for a variety of client pairs. For brevity, only the A-B pairing between RCP client A 260A and RCP client B 260B is discussed herein. However, as a non-limiting example, there may be other client pairing such as A-C, A-D, B-C, B-D, and C-D. All of these various pairing would be managed by the RCP server 210 and each separate pairing may have its own RCP client pair thread running on the RCP server 210.

In the example of FIG. 2, the RCP server 210 conveys RCPs and RCP metadata 252 on an S-A key/metadata path 212 between the RCP server 210 and RCP client A 260A. Similarly, the RCP server 210 conveys RCPs and RCP metadata on an S-B key/metadata path 214 between the RCP server 210 and RCP client B 260B. RCP client A 260A and RCP client B 260B send encrypted data back and forth across a communication path 216. The communication paths (212, 214, and 216) may use any suitable communication interfaces and protocols, such as, for example, BLUETOOTH® wireless signals, 802.1 a/b/g/n type wireless signals, cellular phone signals, TCP/IP, FTP, and HTTP.

The entropy source 220 includes the master RCP pool 224 that holds a collection of generic RCPs for use by the various RCP client pair threads to build and transmit Key RCPs 238 and Data RCPs 232 to the RCP client pair (260A 260B). A pool manager 228 manages pool requests from the master RCP pool 224 to keep the master RCP pool 224 relatively full. For example, if the master RCP pool 224 falls below a predetermined threshold of available RCPs, the master RCP pool 224 may send a request for additional RCPs to the pool manager 228. In some embodiments, request may come from other sources, such as for example, a Key RCP pool 244 in the client pair A-B thread 230, the RCP client pair (260A 260B) it they are running low on Data RCPs or Key RCPs, or the asset inventory thread 250.

A True Random Number Generator (TRNG) 222 is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise. The TRNG 222 delivers random numbers to the master RCP pool 224 to populate RCPs with random numbers. The TRNG 222 may also deliver random numbers to a mapping generator 226 for building a mapping index 227, as explained more fully below.

Turning to the client pair A-B thread 230 (and any other client pair threads not shown), the master RCP pool 224 delivers an RCP to a Data RCP 232. The master RCP pool 224 also delivers the same RCP to the mapping generator 226 where the RCP is mapped into a Key RCP. A mapped Key RCP 238 is delivered to the Key RCP pool 244. In addition, a unique Key RCP identifier 242 used to define which Key RCP from the Key RCP pool 244 is to be used is sent to a compose module 234. The compose module 234 takes the Data RCP 232 as a message body and adds the unique Key RCP identifier 242 as a header. Details of this process are explained more fully below.

An encryption process 236 encrypts the composed Data RCP 232 using a current Key RCP 246 from the Key RCP pool 244. The encryption process 236 is illustrated in FIG. 2 as a simple bitwise XOR. However, other embodiments may include any suitable symmetric encryption process. After encryption, the resulting RCP is transmitted to both RCP client A 260A and RCP client B 260B.

RCP client A 260A and RCP client B 260B operate in a substantially similar manner and include the same elements. As a result, description of the RCP clients 260 will refer to the generic elements without the designator "A" or "B" except where needed. The RCP cipher is received at a decryption process 262. The decryption process 262 uses a current Key RCP 270 to decrypt the RCP and send it to a decompose module 264. The decompose module 264 separates the body portion and sends it to one or more Data RCP pools 272. In some embodiments, separate pools are maintained for send data and receive data. For the RCP clients 260 to properly encrypt and decrypt messages, the RCP clients 260 stay in synchronization. Moreover, some RCP clients 260 may be able to communicate full duplex sending and receiving encrypted messages simultaneously. Thus, to facilitate this complex traffic, each RCP client 260 may maintain a send Data RCP pool 272 and a receive Data RCP pool 272. In such embodiments, the Data RCPs in the send Data RCP pool 272 on one RCP client 260 would match up with the Data RCPs in the receive Data RCP pool 272 and vice versa. Coherence of these various RCPs and RCP pools between the RCP clients 260 may be managed by the asset inventory 250 thread and matching metadata 252 that is sent to the various RCP clients 260.

The decompose module 264 also sends the decrypted RCP (both the body and the header) to a mapping module 266. The mapping module 266 performs a process similar to that used by the mapping generator 226 in the RCP server 210 to convert the Data RCP to a Key RCP. This process is determined by variables in the header and is explained more fully below. The resulting Key RCP is sent to the Key RCP pool 268 for future use. The mapping module 266 may also send the body to one of the data RCP pools 272. The mapping module 266 may also use the decrypted RCP from the decompose module 264 to generate a new mapping index 267 to replace the current mapping index 267 or modify the current mapping index 267.

For secure communication between the RCP clients 260, a current Data RCP 274 is drawn from the appropriate Data RCP pool 272. For example, client A 260A uses a current send Data RCP 274A and an encryption process 276A to encrypt a client message 278A. The encrypted message is sent to client B. Client B uses a current receive Data RCP 274B and a decryption process 276B to generate a decrypted client message 278B. As discussed earlier, in this example the encryption process 276A and decryption process 276B are illustrated as a simple bitwise-XOR and, as a result, can be the same process on both clients. In embodiments using a different type of symmetric encryption, the encryption process and decryption process may be different.

In the reverse direction, client B 260B uses a current send Data RCP 274B and an encryption process 276B to encrypt a client message 278B. The encrypted message is sent to client A. Client A uses a current receive Data RCP 274A and a decryption process 276A to generate a decrypted client message 278A. In both directions, a Data RCP is only used once and is destroyed after use.

System Interaction

Now, a more full system interaction discussion will add additional details concerning RCP management and communications between the RCP server 210 and the RCP client pair (260A 260B). The concept is to provide the clients 260 with matching Data RCPs that they can freely dip into to do standard symmetrical encryption. As stated earlier, in order to avoid certain collision issues, some embodiments may maintain separate Data RCPs for sending and receiving data. The Sending Data RCP of one client pairs with the Receiving Data RCP of the other client.

Metadata may be exchanged between the RCP server 210 and each of the clients 260 independent of the client pairing. This metadata exchange may require additional RCP Pools even before a pairing is established. The use of this link is quite limited, but may be needed in some embodiments. For example, if there were no communications prior to the client pairing, the clients would not know how to request a client pairing.

The following will discuss bootstrapping into a client pairing, then to a client pair startup, then to client communications.

At client installation, each client 260 is loaded with sufficient RCP data to establish a pairing with the RCP server 210, requiring no unencrypted communication. No predefined Mapping Parameters are required. This means the current Key RCP 270 should be loaded and the Key RCP Pool 268 should contain one item. The extra RCP is because the RCP server 210 will be sending RCPs with headers, which is larger than just the RCP. The output of the Data RCP decryption 262 can be redirected to any RCP Pool (receive 272, send 272, key 268) or the mapping index 267 using metadata in the header.

Server Startup & Initialization

The entropy source 220 is started to begin populating the master RCP pool 224. This thread uses the TRNG 222 to generate random numbers for each element of each RCP and starts building the master RCP pool 224. The pool manager 228 monitors the master RCP pool 224 to throttle creation of RCPs when the master RCP pool 224 is near full.

User Logon

A listener thread (not shown) is started on the RCP server 210 to monitor various clients 260 for individual user logins. A user thread (not shown) on the RCP server 210 is started, which handles communications between the individual users on the clients 260 and the RCP server 210. The RCP server 210 sends a new RCP directed to a Key RCP pool 268 for a server/client link. The RCP server 210 loops, creating new Key RCPs until the desired level of Key RCPs in the Key RCP pool 268 for the server/client link (212, 214) is achieved. This link is used for all communications pre-pairing as well as any communication associated with the individual client, as opposed to the pair.

Note that this server/client link is a thread that is not shown in FIG. 2. It is similar to the client pair A-B thread 230, but used to maintain a pairing for RCP management and secure communication between the RCP server 210 and an individual client 260.

User Request for Pairing

A client 260 may request pairing with any other logged in client 260. From the request, the RCP server 210 starts the client pair A-B thread 230. In addition, under direction from the RCP server 210, each client 260 starts its user pair thread for this specific client pairing. While not shown in FIG. 2, a client 260 may be communicating with multiple other clients 260 and would maintain a client pair thread for each client 260 it is communicating with.

The RCP server 210 sends a new RCP directed to the Key RCP pool (268A, 268B) on both clients (260A, 260B). Metadata in the header of the RCP includes randomly selected mapping parameters directed to seed the Data RCP pools (272A, 272B). This process is repeated until a desired level of RCPs in the Key RCP pools (268A, 268B) is reached.

The RCP server 210 sends a new RCP directed to a Data RCP Pool (272A, 272B) for both clients, metadata in the new RCP includes randomly selected mapping parameters directed to seed the Data RCP Pools (272A, 272B). This process is repeated until a desired level of RCPs in the Data RCP pools (272A, 272B) is reached.

The RCP server 210 starts the asset inventory thread 250, which uses metadata to force the client RCP Pools (key 268, send 272, and receive 272) and mapping parameter buffers (not shown) to match. The clients 260 initialize the user pair communications link 216 using any suitable communication interface and protocol.

Mapping parameters are stored in a buffer associated with each Data RCP Pool 272 under the direction of the RCP server 210. New parameters come with each Data RCP received but are not necessarily associated with that pool. The target is decided by the asset inventory thread 250. The parameters may be chosen in a First-In-First-Out (FIFO) manner. If certain errors are encountered the mapping parameters could conceivably run low in which case the asset inventory thread 250 may direct the priority be given to replenishment. The same general comment applies to Key RCP Pools 268 as well. There is a great deal of asymmetry of bandwidth in this setup. Most of the bandwidth between the RCP server 210 and the client 260 is consumed in the RCP movement while all other communications are just small amounts of metadata.

User Pair Communications

Communication between clients 260 may be full duplex. (Meaning both users can send at the same time without collision, if the digital protocol allows it.) Assuming both clients 260 are in synch and client A 260A is sending a client message 278A to client B 260B, then when client A 260A has depleted the current sending Data RCP 274A it simply picks up the next sending Data RCP 274A from the sending Data RCP Pool 272A and continues until done with the current client message 278A or the sending block is full.

When client B 260B receives the block it does the same, but getting the next receiving Data RCP 274B from the receiving Data RCP Pool 272B. If any loss of synchronization occurs, it may be picked up by the GUID, or other RCP identifier, in the block header.

Mapping Data RCPs to Key RCPs

Figure 3:
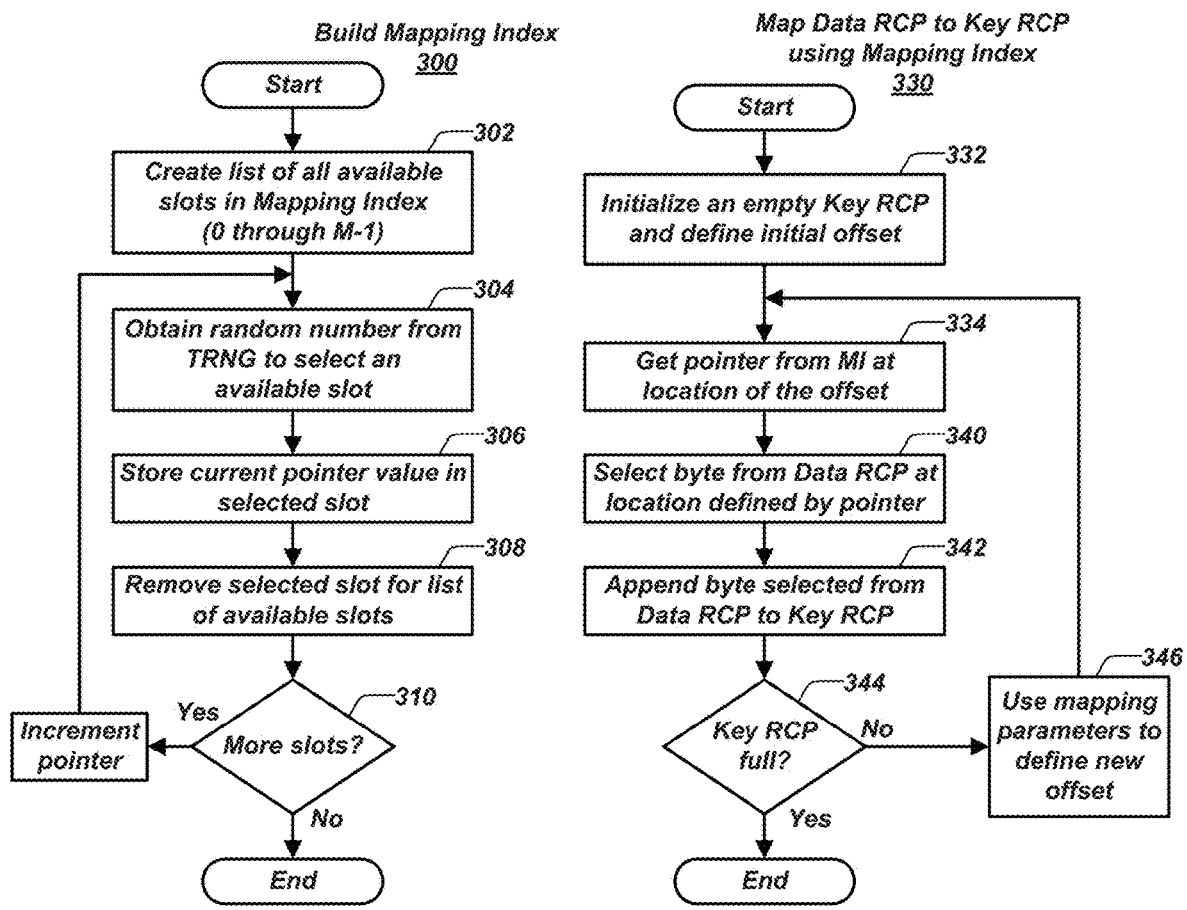
FIG. 3 illustrates processes for generating a mapping index, mapping a Data RCP to a Key RCP using the mapping index, and directly mapping a Data RCP to a Key RCP.

FIG. 3 illustrates processes for generating a mapping index, mapping a Data RCP to a Key RCP using the mapping index, and directly mapping a Data RCP to a Key RCP.

Figure 4:
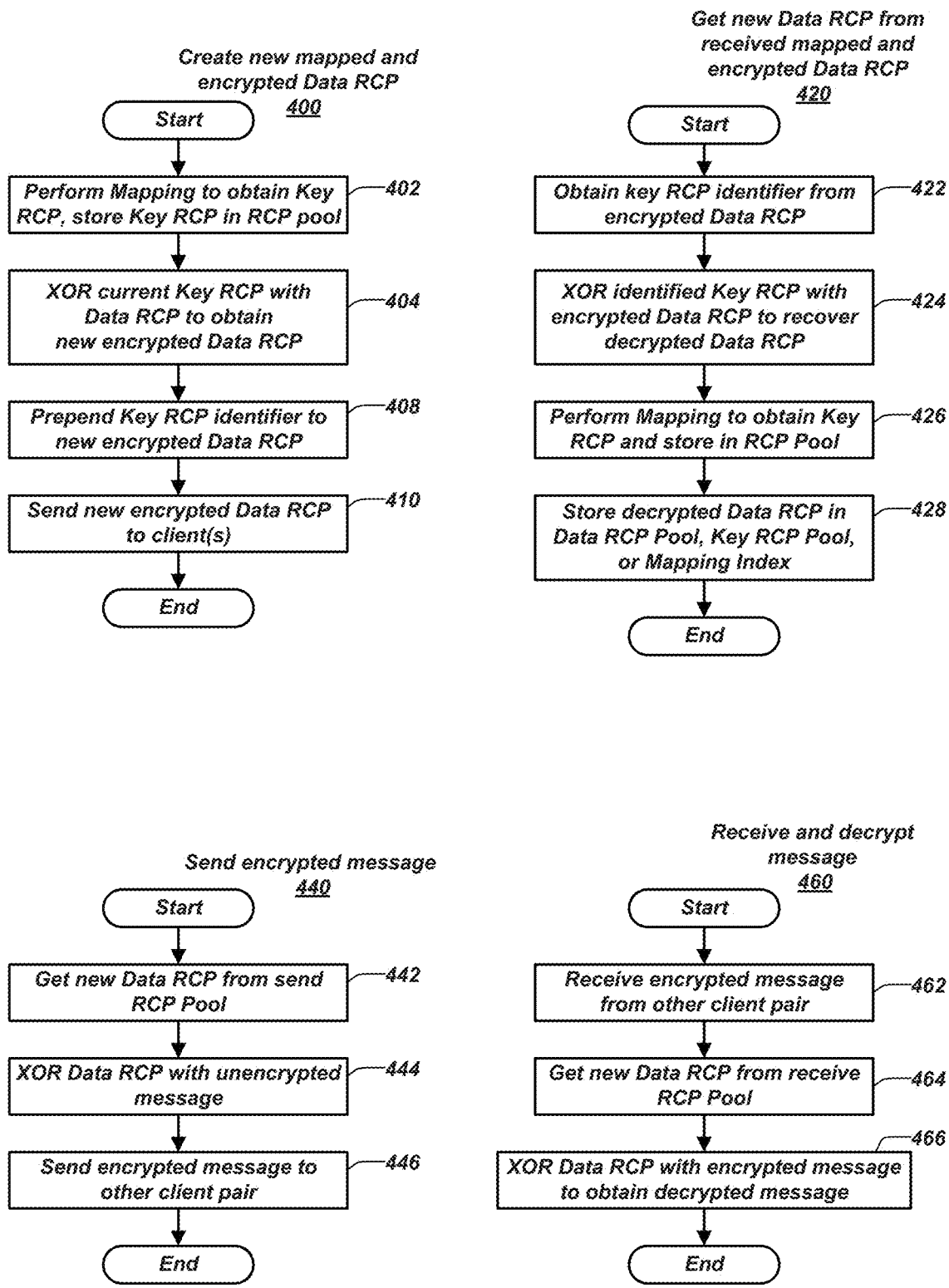
FIG. 4 illustrates processes for creating a new RCP on the RCP server, generating a new RCP from an encrypted RCP on a client, sending an encrypted message, and decrypting a received message.

FIG. 4 illustrates processes for creating a new RCP on the RCP server 210, generating a new RCP from an encrypted RCP on a client, sending an encrypted message, and decrypting a received message.

These figures will be discussed together and in combination with FIG. 2 to fully discuss example embodiments of the mapping processes. In general, the mapping processes apply a pad mapping to a Data RCP using each element of the Data RCP once in a predetermined non-sequential order to develop a Key RCP.

The mapping index can be used to adequately randomize Data RCPs into Key RCPs as long as the mapping index is replaced occasionally. If the mapping index is used many times, even with random addressing methods to select elements of the mapping index, a pattern may emerge in the correlation between the Data RCP and the Key RCP. By making the size of the mapping index prime and using one of many different random addressing methods, the pad mapping process may take different paths through the mapping index for each mapping of a Data RCP to a Key RCP.

Since mapping index replacement may be more bandwidth intensive than moving RCPs, the lifetime of a mapping index before replacement is needed may be extended by using the random addressing methods to take the different paths through the mapping index. As one non-limiting example, a random start location and random step size through the mapping index may be included with an encrypted Data RCP.

FIG. 3 includes a process 300 for building a mapping index. At process 302, a list is created for all the available slots in the mapping index. A pointer value is also initialized to 0 at process 302.

At process 304, a random number is obtained from the TRNG 222 (FIG. 2). This random number is used to select a slot in the mapping index. Thus, for this process the TRNG 222 may be configured to produce random numbers between 0 and M−1.

At process 306, the current pointer value (0 for the first time through the loop) is stored in the slot selected by the random number from the TRNG 222.

At process 308, the currently selected slot is removed from the list of available slots.

At process 310, a decision is performed to determine whether all of the slots in the mapping index have been filled. If so, the process 300 ends. If not, process 304 increments the pointer and the process 300 loops back to process 304 to populate another randomly selected slot with the current pointer value.

FIG. 3 also includes a process 330 for mapping a Data RCP to a Key RCP using the mapping index. For this mapping process, a random addressing method is defined for determining a random path through the mapping index.

As one non-limiting example, an initial location and a step size may be provided to form a process for walking through all locations of the Key RCP. Thus, a step size may be selected that is mutually prime with the size of the mapping index that is being stepped through. This can be accomplished by choosing a size for the mapping index that is prime, or by carefully choosing a step size that is mutually prime with the size of the mapping index (step sizes that are prime themselves, for example).

Many other random addressing methods for the mapping index may be defined for embodiments of the present disclosure as long as mapping parameters for performing the addressing method can be passed between the two nodes that need to follow the same path through the mapping index for any specific mapping of a Data RCP to a Key RCP.

At process 332, an empty Key RCP is initialized. Also, the mapping parameters are used to define an offset into the mapping index as the initial location to begin the process 330.

At process 334, an RCP pointer from the mapping index is selected from the location pointed to by the offset value.

At process 340 the byte from the Data RCP at the location pointed to by the RCP pointer value is selected.

At process 342, the retrieved byte is appended to the next location of the Key RCP.

At process 344, a test is performed to determine if the Key RCP is full. If so, the process ends.

If the Key RCP is not full, process 346 uses the mapping parameters to define a new offset into the mapping index. After the new offset is obtained the process 330 loops back to process 334 and repeats until the Key RCP is fully populated.

The mapping process 330, as well as other suitable mapping processes, may be used in the processes 400 and 420 described below with the description of FIG. 4. These mapping processes may also be referred to herein as pad mapping. In addition, while the Data RCP and Key RCP are described such that each location includes a single byte, other sizes, such as, for example 16-bit words, 32-bit words, and 64-bit words may be used.

FIG. 4 illustrates processes for creating a new RCP on the RCP server 210, generating a new RCP from an encrypted RCP on a client, sending an encrypted message, and decrypting a received message.

Process 400 is a process for creating a new RCP on the RCP server 210. At process 402, a pad mapping according to process 330, or other suitable process for defining a path through the mapping index, is performed to obtain a Key RCP from a Data RCP, the new Key RCP may be stored in the RCP pool.

At process 404, the Data RCP is XORed with a current Key RCP retrieved from the RCP pool to obtain a new encrypted Data RCP. As stated earlier, XOR is one example of a symmetric encryption that may be used. Other embodiments may use a different type of symmetric encryption.

At process 408, a unique Key RCP identifier may be prepended to the new encrypted Data RCP. The prepending is a non-limiting example. The Key RCP identifier could be placed at other locations within the encrypted Data RCP as long as the Key RCP identifier can be used to define the same Key RCP in a Key RCP pool by both the sender and receiver.

At process 410, the encrypted Data RCP with the key RCP identifier included is sent to the RCP client pair (260A 260B).

Process 420 is a process for generating a new RCP from an encrypted RCP on a client 260. This process 420 is performed on each client of the RCP client pair (260A 260B).

At process 422, the encrypted Data RCP with the Key RCP identifier included is received by the client 260 and the Key RCP identifier is extracted from the encrypted Data RCP.

At process 424, the Key RCP identifier is used to select a current Key RCP and the current Key RCP is XORed with the Data RCP to obtain a new decrypted Data RCP. As stated earlier, XOR is one example of a symmetric encryption that may be used. Other embodiments may use a different type of symmetric encryption.

At process 426, a pad mapping according to process 330, or other suitable process for defining a path through the mapping index, may be performed to obtain a Key RCP from the Data RCP. The new Key RCP may be stored in the RCP pool.

At process 428, the new decrypted Data RCP is stored in one of the Data RCP pools 272 (send or receive) the Key RCP Pool 268 (when building a reserve of Key RCPs), or the mapping index 267 when directed by the asset inventory thread 250 from the RCP server 210.

Process 440 is a process for encrypting a client message and sending the encrypted message. At process 442, a Data RCP 274 is obtained from the send Data RCP Pool 272. In some embodiments that don't enable full duplex communication, there may be a single Data RCP pool 272 rather than a send Data RCP pool 272 and a receive Data RCP pool 272.

At process 444, an unencrypted client message 278 is XORed 276 with the Data RCP 274 to obtain an encrypted message. As stated earlier, XOR is one example of a symmetric encryption that may be used. Other embodiments may use a different type of symmetric encryption.

At process 446, the encrypted message is sent to the other client participating in this client pair.

Process 460 is a process for receiving an encrypted message and decrypting the message. At process 462, the encrypted message is received from the other client participating in this client pair.

At process 464, a Data RCP 274 is obtained from the receive Data RCP Pool 272. In some embodiments that don't enable full duplex communication, there may be a single Data RCP pool 272 rather than a send Data RCP pool 272 and a receive Data RCP pool 272.

At process 466, the encrypted client message is XORed 276 with the Data RCP 274 to obtain an unencrypted client message 278. As stated earlier, XOR is one example of a symmetric encryption that may be used. Other embodiments may use a different type of symmetric encryption.

Figure 5A:
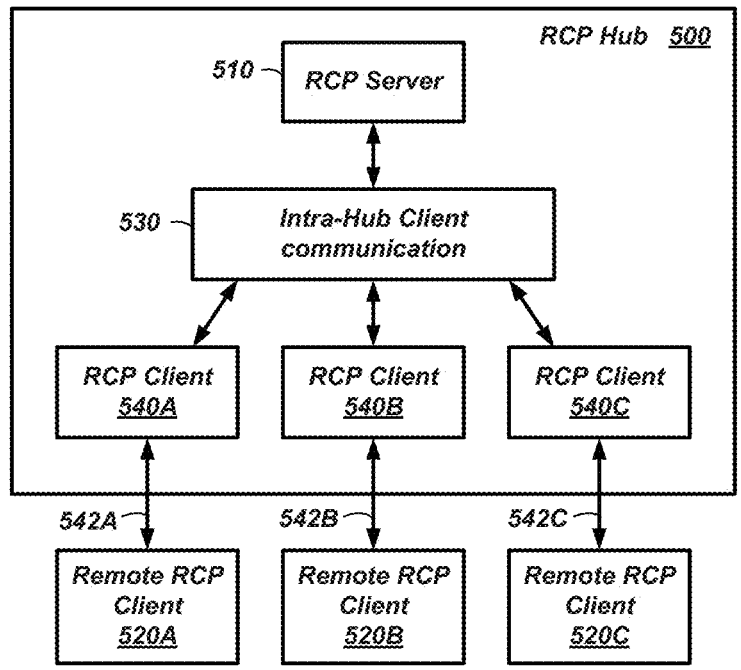
FIG. 5A is a simplified block diagram illustrating an embodiment of an RCP Hub.

FIG. 5A is a simplified block diagram illustrating an embodiment of an RCP hub 500. The RCP hub 500 includes an RCP server 510 and RCP clients 260. In some embodiments, the RCP server 510 may be similar to the RCP server 210 of FIG. 2 and the RCP clients 540 may be similar to the RCP clients 260 of FIG. 2. In some embodiments one or more of the RCP clients 540 may be similar to the RCP client 560 discussed below when describing FIG. 5B. The RCP Hub 500 can be used to facilitate client-to-client communications where the clients do not communicate directly. The encrypted communication paths 542 would be similar to encrypted communication path 216 in FIG. 2.

As a non-limiting example of client communication, remote RCP client 520A may wish to communicate with remote RCP client 520C through the RCP hub 500. Remote RCP client 520A would send encrypted client messages through encrypted communication path 542A to RCP client 540A using a client pairing between RCP client 540A and remote RCP client 520A. RCP client 540A would decrypt the client message and send it through an intra-hub Client communication block 530 to RCP client 540C. RCP client 540C would then encrypt the client message using a client pairing between RCP client 540C and remote RCP client 520C and send the encrypted message to remote RCP client 520C over encrypted communication path 542C. Remote RCP client 520C can then decrypt the client message. Of course messages could pass the other way from remote RCP client 520C to remote client 520A and need not be described in detail.

Client pairings may be defined by the RCP server 510 and the proper Key RCPs and Data RCPs may be sent to each side of the client pairing so they have the proper RCPs to encrypt and decrypt client messages.

The intra-hub client communication 530 may be any form of moving client messages between RCP clients 540 on the RCP hub 500. For example, the intra-hub client communication 530 could be a byte-stream between clients 540, a data structure in memory of the RCP server 510 (e.g., a FIFO) that both clients can access, or other suitable means of passing data between threads.

Including the RCP server 510 in the RCP hub 500 allows the RCP Hub 500 to have a TRNG, thus having the ability to create RCPs and allowing the RCP Hub 500 to then distribute RCPs to the various endpoints. During downtime, the RCP Hub 500 may generate entropy to build replacement RCPs that are physically distributed. The RCP Hub 500 if properly cited in a high security environment could also be associated with storage of RCPs for data at rest somewhere else in an enterprise system.

In some embodiments, a simpler RCP hub may not include the RCP server 510. In such systems, the RCP clients 540 would need to obtain their RCPs for client pairings from an encrypted communication path between a remote RCP server (not shown) and the RCP clients 540 on the RCP hub 500.

Figure 5B:
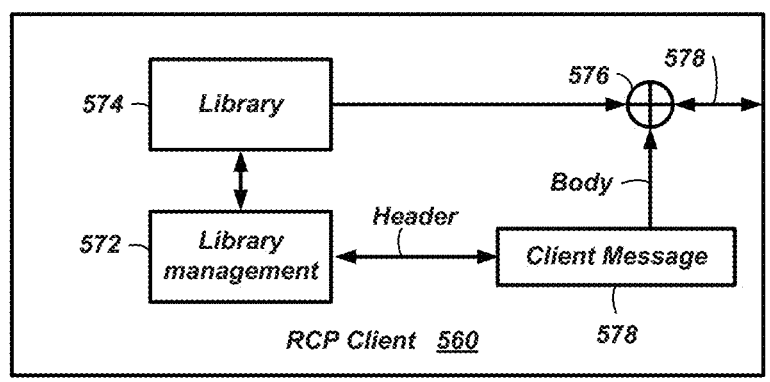
FIG. 5B is a simplified block diagram illustrating an embodiment of an RCP client using a pre-loaded RCP library.

FIG. 5B is a simplified block diagram illustrating an embodiment of an RCP 560 client using a pre-loaded RCP library 574. Some applications of embodiments of the present disclosure may have limited bandwidth that make dynamic delivery of RCPs impractical. In situations where dynamic RCP replacement is not possible, or impractical, and the profile of the mission needing RCPs is known in advance everything that is needed for the mission to succeed can be known in advance. In these situations it is possible to create and pre-position all the RCP data required to support the mission in advance. The pre-loaded RCP library 574 is a large RCP with enough random elements to enable encrypted communications for an entire mission without the need to exchange replacement RCPs electronically during operations. In some embodiments, the pre-loaded RCP library 574 may be physically replaced or hardwire replaced at a main operations center for the system during downtime. In some embodiments, the pre-loaded RCP library 574 is generated by an RCP server and pre-loaded into the RCP client 560 before the mission. In some embodiments with permissive bandwidth and security requirements, some or all of the pre-loaded RCP library 574 may be updated during the mission if needed.

An RCP clients 560 using a large pre-loaded RCP library 574 may be simpler than the RCP client 260 shown in FIG. 2. Many of the processes for decrypting data RCPs, and mapping to generate Key RCPs are not needed if a pre-loaded RCP library 574 is available.

The RCP library 574 may be configured to include kilobytes to gigabytes of truly random data. The client pairings would each include a matching pre-loaded RCP library 574. As a non-limiting example of communication, the sending client would prepend to the body of the client message 578 a header including parameters for generating an address of where to start reading random data from the pre-loaded RCP library 574 for encryption and decryption 576. Of course, the parameters need not be prepended as a header, but could be included anywhere in the encrypted message 578 as long as the receiver knows where to extract the parameters.

A library manager 572 may be used to manage the generation of the addresses of where to start and define the mapping parameters to be sent on the sending side. On the receiving side, the library manager 572 may be used to extract the parameters and use them to determine the address of where to start for decryption.

These type of RCP clients 560 may be used in applications where a device including the RCP client 560 may be captured, stolen, or otherwise intercepted. As non-limiting examples, the Unmanned Aerial Vehicle (UAV) 610 of FIG.

Figure 7:
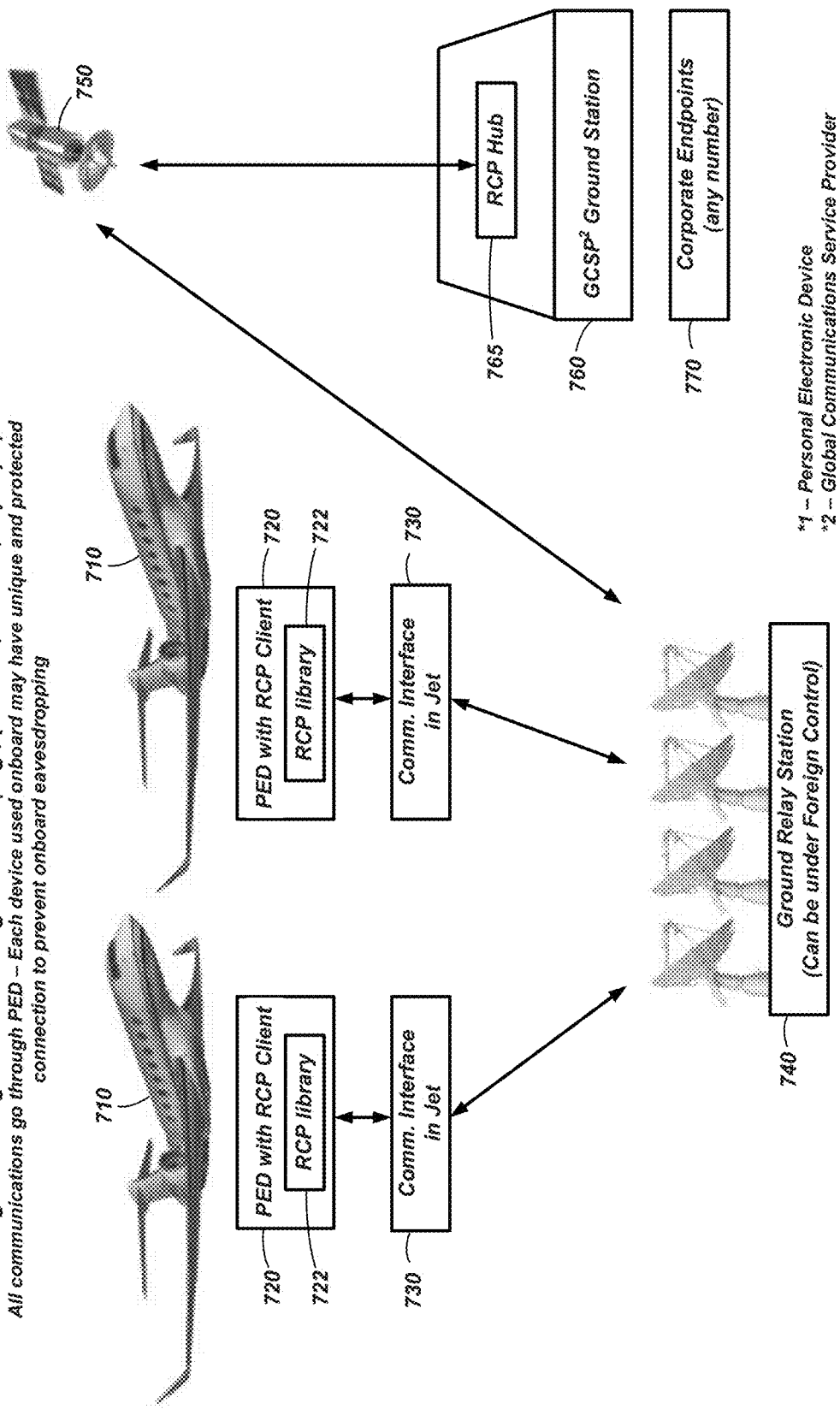
FIG. 7 is a block diagram illustrating an aircraft communication system using one or more embodiments of the present disclosure.

6, and the Personal Electronic Device (PED) 720 of FIG. 7 may be vulnerable to capture. Thus, some embodiments of the present disclosure may delete used locations of the pre-loaded RCP library 574. The library manager 572 may manage processes to erase the data that has been used. Thus data used for encryption on a send path and data used for decryption on a receive path may be erased. The erasure process may be complex to ensure the data is fully erased and may be different for different types of data storage. In other words, an erasure process for magnetic storage may be more complex that an erasure process for electronic storage or solid-state storage. With the used information erased, assuming an interceptor recorded every message between two clients, it is impossible for the interceptor to decode any message, past, present, or future.

In some embodiments, the pre-loaded RCP library 574 may be configured as a pool of RCPs, similar to the Data RCP Pools 272 of FIG. 2. In these configurations, the prepended parameters may include a starting address (within the first RCP), a list of GUIDs (or other unique identifier) that resolve to all the RCPs used in this message, and an ending address (within the last RCP need for the current message).

Figure 6:
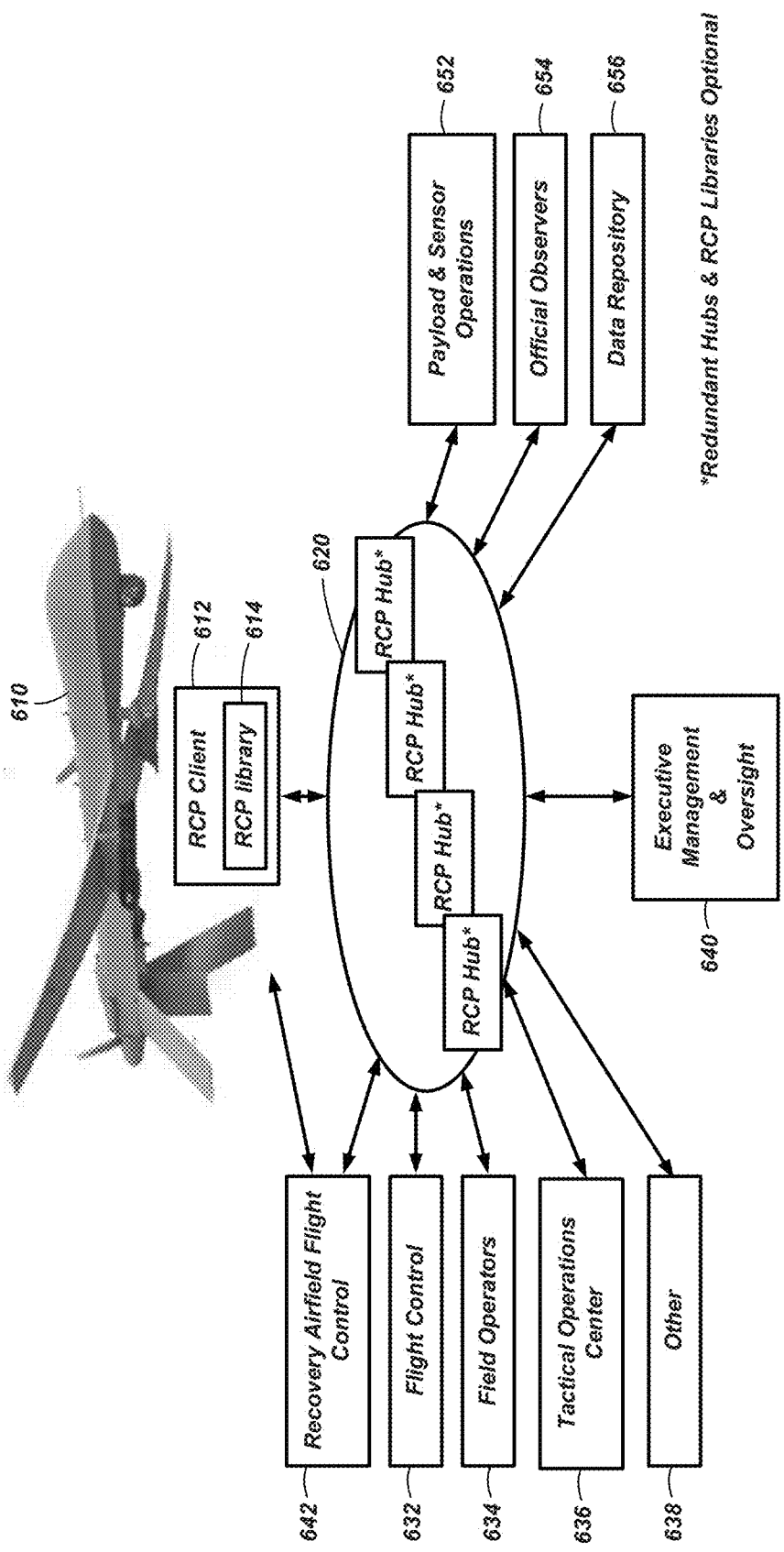
FIG. 6 is a block diagram illustrating an Unmanned Aerial Vehicle (UAV) system using one or more embodiments of the present disclosure.

FIG. 6 is a block diagram illustrating an Unmanned Aerial Vehicle (UAV) 610 system using one or more embodiments of the present disclosure. This system enables secure communication using embodiments of the present disclosure for enterprise operations of one or more UAVs 610. The public commonly refers to these machines as drones and it is convenient, however the industry generally uses the term UAV 610. There are numerous concerns for UAV 610 operations starting with securing the command & control (C2) link, which allows ground controllers to fly the aircraft. For the larger, more expensive, drones especially ones with armaments, there are several separate and redundant C2 channels and ground control centers. This redundant architecture is to preserve positive control and prevent an advisory just blocking signals to/from the aircraft.

In FIG. 6, the UAV 610 communicates through one or more RCP hubs 620 to all stakeholders wherever they are globally. The UAV 610 includes an RCP client 612 and an RCP library 614 for communicating with the RCP hub 620 as discussed above when describing FIGS. 5A and 5B.

In some embodiments, an RCP hub 620 may comprise an RCP server 210 and two or more RCP clients 260 (e.g., the RCP hub 500 of FIG. 5) such that all communications, whether they be RCP management and distribution or encrypted data communications are secure. In other embodiments, the RCP hub may include two or more clients and each of the RCP clients in the RCP hub would communicate with a remote RCP hub.

These secure communications may come from a variety of operational and management stakeholders. As non-limiting examples, FIG. 6 shows payload and sensor operations 652, official observers 654, data repositories 656, executive management and oversight 640, flight control 632, field operators 634, a tactical operations center 636, recovery airfield flight control 642, as well as other 638 stakeholders. Each of the communicating blocks, including the UAV 610, includes at least one RCP client to facilitate the secure communications through an RCP Hub 620 according to embodiments of the present disclosure.

Redundant RCP hubs 620 may be used to facilitate completely separate distributed hubs to insure positive control and receipt of download data. In addition, multiple RCP hubs 620 may be used such that different RCP hubs are dedicated to different types of data traffic (e.g., different priorities such as real time sensitive traffic relative to oversight or archive traffic).

A significant aspect of UAV operations is bandwidth. A substantial amount of the bandwidth is used for sensor and C2 traffic with little to spare. In embodiments of the present disclosure a library of Data RCPs can be pre-generated and installed onboard the aircraft before takeoff, such that the library is sufficient to handle an entire mission. This library eliminates the need for uploading RCP data inflight.

In the event of potential capture of the machine, to protect the library, embodiments of the present disclosure include a non-destructive yet innovative system for this action; in essence when a RCP, or portion of an RCP library, has been used it may be erased, as described above. There is now nothing on the aircraft that could allow access to the transmission or stored data, the only RCP is on the RCP hub 620 on the ground. Unused RCPs that may be captured are not useful because the corresponding RCP on the ground is simply destroyed never to be used. Additionally, this system enables each and every communication link to be separately and uniquely encrypted endpoint to endpoint.

In this model, the RCP hub 620 becomes a nexus through which all traffic from any endpoint to any other is encrypted and a redundant hub is able to directly communicate with the network through the initial hub. Encrypted traffic entering the hub(s) is transferred with a new encrypted RCP for onward encrypted distribution. With this method, traffic never passes through an unencrypted state anytime during the process, thus providing continuous security.

This system also enables the ability to accomplish the RCP client 260 installations, plus initialization of an RCP library, well in advance of their possible use. For example, special operators can have the install done before leaving their home base in the US for overseas deployment. Then, when a particular operator is activated on a later mission, the operator has full secure communications with command authority globally.

The recovery airfield flight control 642 includes the people actually controlling the UAV 610 as it takes off or returns to land. During these flight periods, a lower latency communication path may be useful while still preserving security. Thus, in some embodiments, the recovery airfield flight control 642 may be able to communicate directly with the UAV 610 without going through the RCP hub 620, but still using RCP encryption on a direct path. In these embodiments, the recovery airfield flight control 642 would also include an RCP library (not shown) with the same information as the RCP library 614 in the UAV 610 and RCP hub 620. As a result, the recovery airfield flight control 642 may have a dual path to the aircraft, one through the RCP hub 620 and a direct link when authorized for takeoff and landing procedures.

While embodiments of FIG. 6 are discussed with respect to UAVs, they can also be applied to other unmanned applications, such as, for example, unmanned vehicle applications such as ground vehicles, water vehicles, and robots.

FIG. 7 is a block diagram illustrating an aircraft communication system using one or more embodiments of the present disclosure. As with the UAV application, bandwidth is again a precious commodity in aircraft communications. The connection speeds are not great and the costs are astounding.

The embodiments of FIG. 7 include a carry-aboard Personal Electronic Device (PED) 720 as an RCP system including a pre-loaded RCP library as discussed above with reference to FIG. 5B, thus eliminating the need to upload relatively bandwidth intensive RCPs. Business aviation communications are generally handled by private vendors. In order for an aircraft 710 to have connectivity it must be fitted out with all the required communication interfaces 730, such as, for example, WiFi routers, modems transceivers, and antennas (collectively shown as element 730) to principally communicate with ground relay stations 740 or satellites 750 along their route of flight. From ground stations 740, the traffic may be beamed up to a satellite 750 for transmission to a Global Communications Service Provider (GCSP) 760.

However, many global ground relay stations 740 are government owned and operated and many of those governments are not particularly friendly with the United States. For this reason, most sophisticated business aviation operators know by whom and where their ground relay is being handled. Most of these operators will physically turn off the system when entering into unfriendly areas (e.g., China). That said, many of these same operators spend a great deal of flight time over China and want to be productive with their time. Some GCSPs 760 now are utilizing 256-bit encryption, which has or will be broken by quantum computing.

In addition, all the communication gear 730 on the aircraft 710 for the GCSP 760 is costly and proprietary in that it only works with the systems of the company who installed the system. This proprietary result is largely due to FAA regulations, which very closely supervise any hardware installed or attached to an aircraft 710. For each specific make & model piece of equipment installed on any make or model aircraft 710 the vendor must obtain FAA certification called a Supplemental Type Certificate (STC). The company that pays to develop and obtain the STC then owns it for all install of that particular equipment on that particular aircraft type. Any competitor must either buy access to the STC and the specific equipment may not work with their operation or develop their own STC.

In some embodiments, the STC equipment is installed on the aircraft all in compliance with FAA and may include an FAA authorized Personal Electronic Device (PED) 720 carried onboard the aircraft 710. This PED 720 may be carried in a manner similar to a Kindle, laptop, or tablet on a commercial flight. It is not physically attached to the aircraft, but a portable device. The PED 720 contains a large RCP library 722 and RCP client as described above with reference to FIG. 5B, and two separate wireless network platforms. The first network (e.g., sub-WiFi or BLUETOOTH®), is to connect with the executive's and crew's laptops/tablets with the PED 720. From there, encrypted traffic is passed by the PED 720 to the aircraft communication channel (e.g., WiFi) and from there normally to a ground relay station 740. Of course, over oceans this link may have to go direct to a satellite 750. The GCSP 760 equipment may handle these decisions.

The data between the PED 720 and the RCP Hub 765 at the GCSP 760 is non-dynamic and may be configured to use an RCP library according to the embodiment of FIG. 5A, whereas the data between the PED 720 and the individual user's devices is dynamic and may be configured to use an RCP client according to the embodiment of FIG. 2. Thus, the RCP library may be included on the PED 720, but not needed in the user's machines. The user's machines may use an RCP client according to the embodiment of FIG. 2 if onboard encryption is desired.

Eventually the traffic is downlinked to the GCSP 760 operations center, most have several globally distributed locations. In some embodiments, the RCP hub 765 would be located at the GCSP 760 OpCenter where final decryption may take place.

An alternative system could have the RCP hub 765 located at corporate endpoints 770 (e.g., a corporate headquarters). In this instance, traffic passing through the RCP hub 765 could be simply passed on by any communications system to headquarters as it is still fully encrypted until reaching the RCP hub 765. Either of these structured RCP hub 765 architectures could accept encrypted traffic, transfer it to a RCP hub 765 and send it out to any authorized RCP hub 765 end-point.

The cost benefit of having the RCP hub 765 co-located at the GCSP 760 OpCenter is that instead of the RCP hub 765 supporting just one corporation a somewhat enhanced RCP hub 765 may support many different corporations simultaneously. Thus having a single RCP hub 765 owned and operated by a single entity who in turn sells the service to many separate companies through a channel partnership relationship.

Figure 8:
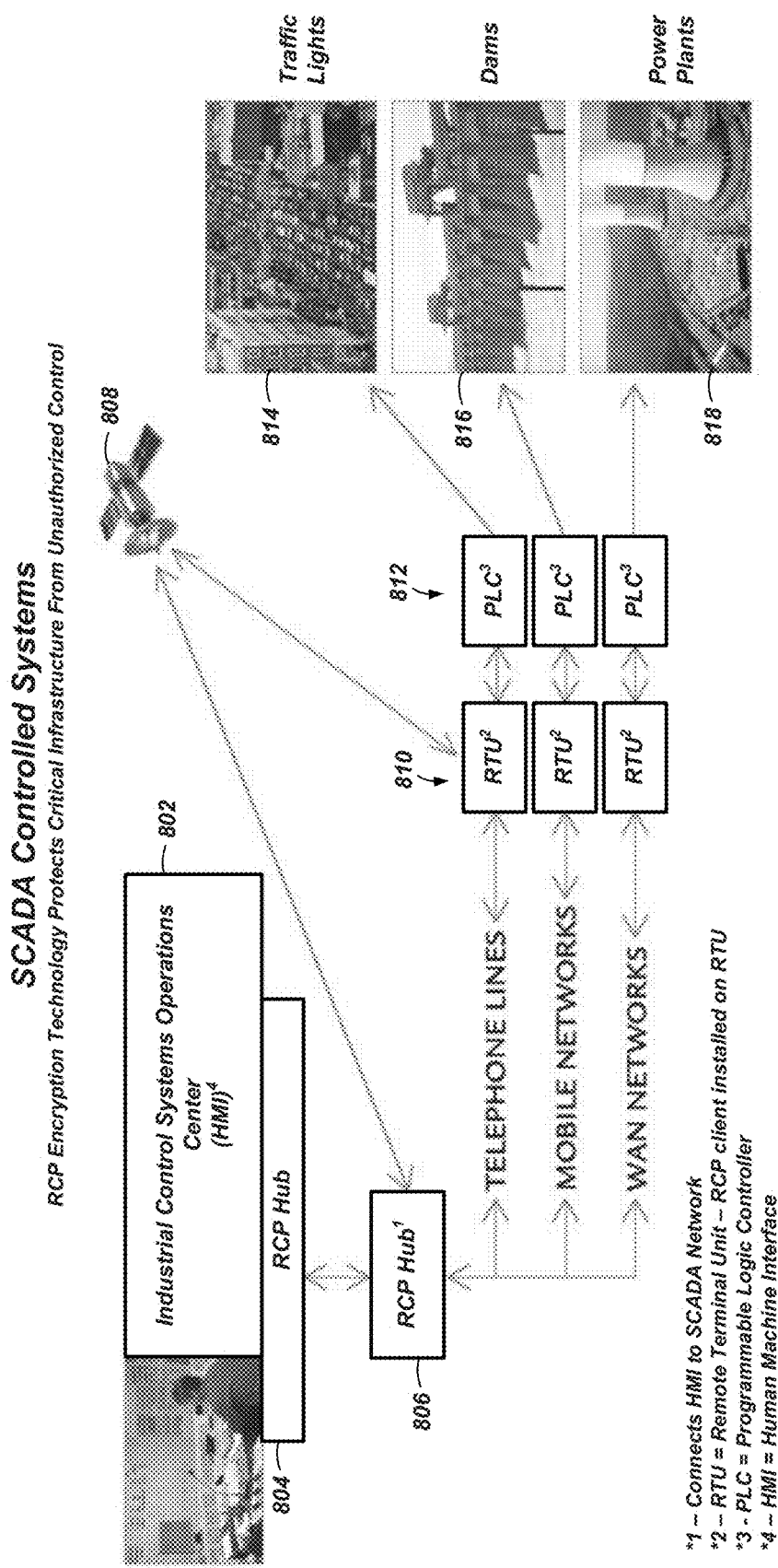
FIG. 8 is a block diagram illustrating a Supervisory Control And Data Acquisition (SCADA) system using one or more embodiments of the present disclosure.

FIG. 8 is a block diagram illustrating a Supervisory Control And Data Acquisition (SCADA) system 802 using one or more embodiments of the present disclosure.

Supervisory Control and Data Acquisition (SCADA) systems 802 manage most of the infrastructure operations we depend on every day. SCADA systems manage a myriad of essential networks (e.g., traffic lights 814, subways, water & electrical systems 816, 818, industrial plants, etc.), all things with which we interact on a daily basis. Most infrastructure systems operate semi-autonomously under the oversight and control of a human machine interface (HMI) typically located at a central operations center 802.

Placing an RCP-Hub 804 at the central operations location 802 enables end-to-end secure communications throughout the enterprise, with no ability for hackers to interfere with operations or decrypt information, creating a quantum-proof safe system. At the distributed ends of the system are remote terminal units (RTU) 810 converting digital telemetry into mechanical action commands for the programmable logic controllers (PLCs) 812 which monitor and actuate valves, switches, etc.

Installing an RCP hub 806 in conjunction with the RTUs 810 can eliminate system security issues and provides secure transactions to all SCADA-based systems. The RCP hub 806 may communicate with the RTUs 810 through a variety of channels, such as, for example, satellites 808, telephone lines, mobile networks, and WAN networks.

In some embodiments, the RCP hub 806 may not be included and each RTU may include an RCP client (not shown) as described above with reference to FIG. 2 or FIG. 5a. In still other embodiments, the system may include both RCP hubs (804 and 806) as well as RCP clients in the RTUs 810

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A computer-implemented method for performing cryptographic procedures, comprising:

populating one or more Random Cipher Pads (RCPs) with random numbers generated by a hardware module comprising a True Random Number Generator (TRNG);

storing the one or more Random Cipher Pads (RCPs) on a computing system;

defining an initial location in a Data RCP of the one or more RCPs;

applying a pad mapping to the Data RCP of the one or more RCPs using elements of the Data RCP starting at the initial location in a predetermined non-sequential order at a selected step size defined by mapping parameters of the pad mapping to develop a Key RCP for subsequent use;

combining the mapping parameters with at least a portion of the Data RCP;

encrypting the at least a portion of the Data RCP using the Key RCP and an encryption process to produce an encrypted Data RCP; and transmitting the encrypted Data RCP along with the combined mapping parameters.

2. The computer-implemented method of claim 1, further comprising developing a mapping index and populating the mapping index with random numbers.

3. The computer-implemented method of claim 1, further comprising defining the mapping parameters to comprise a predetermined order for selecting elements from the Data RCP.

4. The computer-implemented method of claim 1, wherein the encryption process comprises a bitwise exclusive-OR between the Key RCP and the Data RCP.

5. The computer-implemented method of claim 1, further comprising incorporating one or more RCP client processes, wherein each RCP client process comprises:

receiving an encrypted RCP including client mapping parameters for use with a client mapping index;

decrypting the encrypted RCP using a current Key RCP and a decryption process to produce a decrypted RCP;

storing the decrypted RCP in at least one location selected from the group consisting of a Key RCP pool, a Data RCP pool, or the client mapping index;

encrypting a data structure using a current Data RCP from the Data RCP pool with another encryption process to produce an encrypted data structure; and transmitting the encrypted data structure to another computing system.

6. The computer-implemented method of claim 1, further comprising incorporating one or more RCP client processes, wherein each RCP client process comprises:

receiving an encrypted RCP including client mapping parameters for use with a client mapping index;

decrypting the encrypted RCP using a current Key RCP and a decryption process to produce a decrypted RCP;

storing the decrypted RCP in at least one location selected from the group consisting of a Key RCP pool, a Data RCP pool, or the client mapping index;

receiving an encrypted data structure from another computing system; and decrypting the encrypted data structure using a current Data RCP from the Data RCP pool with another decryption process to produce a decrypted data structure.

7. A system including a computing system configured as a special-purpose computer for performing cryptographic procedures, the computing system comprising:

one or more Random Cipher Pads (RCPs) stored on the computing system;

a memory configured for storing computing instructions; and a processor operably coupled to the memory and configured for executing the computing instructions to perform the cryptographic procedures using the one or more RCPs and processes comprising:

populating the one or more Random Cipher Pads (RCPs) on the computing system with random numbers generated by a hardware module comprising a True Random Number Generator (TRNG);

defining an initial location in a Data RCP of the one or more RCPs:

applying a pad mapping to the Data RCP of the one or more RCPs using elements of the Data RCP at the initial location in a predetermined non-sequential order at a selected step size defined by mapping parameters of the pad mapping to develop a Key RCP for subsequent use;

combining the mapping parameters with at least a portion of the Data RCP;

encrypting the at least a portion of the Data RCP using the Key RCP and an encryption process to produce a subsequent Data RCP; and transmitting the subsequent Data RCP along with the combined mapping parameters.

8. The system of claim 7, further comprising a True Random Number Generator (TRNG) and wherein the processor is further configured for executing the computing instructions to develop a mapping index and populating the mapping index with random numbers generated by the TRNG.

9. The system of claim 7, wherein the processor is further configured for executing the computing instructions to define a predetermined order for selecting elements from the Data RCP.

10. The system of claim 7, wherein the processor is further configured for executing the computing instructions to perform the encryption process as a bitwise exclusive-OR between the Key RCP and the Data RCP.

11. The system of claim 7, further comprising a client computing system including a client processor, wherein the client processor is configured for executing computing instructions incorporating one or more RCP client processes, wherein each RCP client process comprises:

receiving an encrypted RCP including client mapping parameters for use with a client mapping index stored on the computing system;

decrypting the encrypted RCP using a current Key RCP and a decryption process to produce a decrypted RCP;

storing the decrypted RCP in at least one location selected from the group consisting of the Key RCP pool, a Data RCP pool, or the client mapping index;

encrypting a data structure using a current Data RCP from the Data RCP pool with another encryption process to produce an encrypted data structure; and transmitting the encrypted data structure to another computing system.

12. The system of claim 7, further comprising a client computing system including a client processor, wherein the client processor is configured for executing computing instructions incorporating one or more RCP client processes, wherein each RCP client process comprises:

receiving an encrypted RCP including client mapping parameters for use with a client mapping index stored on the computing system;

decrypting the encrypted RCP using a current Key RCP and a decryption process to produce a decrypted RCP;

storing the decrypted RCP in at least one location selected from the group consisting of the Key RCP pool, a Data RCP pool, or the client mapping index;

receiving an encrypted data structure from another computing system; and decrypting the encrypted data structure using a current Data RCP from the Data RCP pool with another decryption process to produce a decrypted data structure.

13. A computer-implemented method for performing cryptographic procedures, comprising:

storing one or more Random Cipher Pads (RCPs) on a computing system;

receiving an encrypted RCP including mapping parameters for use with a mapping index stored on the computing system;

decrypting the encrypted RCP using a current Key RCP and a decryption process to produce a decrypted RCP;

applying a pad mapping to the decrypted RCP using each element of the decrypted RCP once in a predetermined non-sequential order defined by the mapping parameters and the mapping index to develop a subsequent Key RCP;

storing the subsequent Key RCP in a Key RCP pool;

storing the decrypted RCP in at least one location selected from the group consisting of the Key RCP pool, a Data RCP pool, and the mapping index;

receiving an encrypted data structure from another computing system; and decrypting the encrypted data structure using a current Data RCP from the Data RCP pool with another decryption process to produce a decrypted data structure.

14. The computer-implemented method of claim 13, further comprising:

encrypting a data structure using the current Data RCP with an encryption process to produce a second encrypted data structure; and transmitting the second encrypted data structure to another computing system.

15. The computer-implemented method of claim 14, further comprising:

erasing the current Data RCP from the computing system; and selecting another Data RCP from the Data RCP pool as a new version of the current Data RCP.

16. The computer-implemented method of claim 13, further comprising:

erasing the current Data RCP from the computing system; and selecting another Data RCP from the Data RCP pool as a new version of the current Data RCP.

17. The computer-implemented method of claim 13, wherein the decryption process comprises a bitwise exclusive-OR between the encrypted RCP and the current Key RCP to produce the decrypted RCP.

18. A computing system configured as a special-purpose computer for performing cryptographic procedures, the computing system comprising:

one or more Random Cipher Pads (RCPs) stored on the computing system;

a memory configured for storing computing instructions; and a processor operably coupled to the memory and configured for executing the computing instructions to perform the cryptographic procedures using the one or more RCPs and processes comprising:

receiving an encrypted RCP including mapping parameters for use with a mapping index stored on the computing system;

decrypting the encrypted RCP using a current Key RCP and a decryption process to produce a decrypted RCP;

applying a pad mapping to the decrypted RCP using each element of the decrypted RCP once in a predetermined non-sequential order defined by the mapping parameters and the mapping index to develop a subsequent Key RCP;

storing the subsequent Key RCP in a Key RCP pool;

storing the decrypted RCP in at least one location selected from the group consisting of the Key RCP pool, a Data RCP pool, and the mapping index;

encrypting a data structure using a current Data RCP from the Data RCP pool with an encryption process to produce an encrypted data structure; and transmitting the encrypted data structure to another computing system.

19. The computing system of claim 18, wherein the processor is further configured for executing the computing instructions for:

erasing the current Data RCP from the computing system; and selecting another Data RCP from the Data RCP pool as a new version of the current Data RCP.

20. The computing system of claim 18, wherein the processor is further configured for executing the computing instructions to perform the decryption process as a bitwise exclusive-OR between the encrypted RCP and the current Key RCP to produce the decrypted RCP.

21. A computing system configured as a special-purpose computer for performing cryptographic procedures, the computing system comprising:

one or more Random Cipher Pads (RCPs) stored on the computing system;

a memory configured for storing computing instructions; and a processor operably coupled to the memory and configured for executing the computing instructions to perform the cryptographic procedures using the one or more RCPs and processes comprising:

receiving an encrypted RCP including mapping parameters for use with a mapping index stored on the computing system;

decrypting the encrypted RCP using a current Key RCP and a decryption process to produce a decrypted RCP;

applying a pad mapping to the decrypted RCP using each element of the decrypted RCP once in a predetermined non-sequential order defined by the mapping parameters and the mapping index to develop a subsequent Key RCP;

storing the subsequent Key RCP in a Key RCP pool;

storing the decrypted RCP in at least one location selected from the group consisting of the Key RCP pool, a Data RCP pool, and the mapping index;

receiving an encrypted data structure from another computing system; and decrypting the encrypted data structure using a current Data RCP from the Data RCP pool with another decryption process to produce a decrypted data structure.

22. The computing system of claim 21, wherein the processor is further configured for executing the computing instructions for:

erasing the current Data RCP from the computing system; and selecting another Data RCP from the Data RCP pool as a new version of the current Data RCP.

23. The computing system of claim 21, wherein the processor is further configured for executing the computing instructions to perform the decryption process as a bitwise exclusive-OR between the encrypted RCP and the current Key RCP to produce the decrypted RCP.

24. A computer-implemented method for performing cryptographic procedures, comprising: populating a pool of random cipher pads with random numbers generated by a hardware module
comprising a true random number generator; storing the pool of random cipher pads on a computing system; defining an initial location in a portion of the pool of random cipher pads; applying a pad mapping to the portion of the pool of random cipher pads starting at the initial
location in a predetermined non-sequential order at a selected step size defined by
mapping parameters of the pad mapping to develop a key for subsequent use; encrypting a pad selected from the pool of random cipher pads using the key and an encryption process to produce an encrypted pad; and
transmitting the encrypted pad to another computer for use in one of another encryption process or a decryption process.

25. The computer-implemented method of claim 24, further comprising transmitting the encrypted pad along with the mapping parameters.

26. The computer-implemented method of claim 24, further comprising defining the mapping parameters to comprise a predetermined order for selecting elements from the portion of the pool of random cipher pads.

27. A computing system configured as a special-purpose computer for performing cryptographic procedures, the computing system comprising:
one or more random cipher pads (RCPs) stored on the computing system;
a memory configured for storing computing instructions; and
a processor operably coupled to the memory and configured for executing the computing instructions to perform the cryptographic procedures using the one or more RCPs and processes comprising:
populating the one or more random cipher pads with random numbers generated by a hardware module comprising a true random number generator (TRNG);
defining an initial location in a portion of the one or more random cipher pads;
applying a pad mapping to the portion of the one or more random cipher pads starting at the initial location in a predetermined non-sequential order at a selected step size defined by mapping parameters of the pad mapping to develop a key for subsequent use;
encrypting a pad selected from the one or more random cipher pads using the key and an encryption process to produce an encrypted pad; and
transmitting the encrypted pad to another computer for use in one of another encryption process or a decryption process.

28. The computing system of claim 27, wherein the processor is further
configured for executing the computing instructions to:
combine the mapping parameters with the encrypted pad; and
transmit the encrypted pad along with the combined mapping parameters.

29. The computing system of claim 27, wherein the processor is further configured for executing the computing instructions to define the mapping parameters to comprise a predetermined order for selecting elements from the portion of the one or more random cipher pads.

* * * * *